US009661193B2

(12) United States Patent
Narumi

(10) Patent No.: US 9,661,193 B2
(45) Date of Patent: May 23, 2017

(54) IMAGING APPARATUS AND ANALYZING APPARATUS

(71) Applicant: Panasonic Intellectual Property Management Co., Ltd., Osaka (JP)

(72) Inventor: Kenji Narumi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 159 days.

(21) Appl. No.: 14/804,333

(22) Filed: Jul. 21, 2015

(65) Prior Publication Data

US 2016/0037021 A1 Feb. 4, 2016

(30) Foreign Application Priority Data

Aug. 1, 2014 (JP) ................................. 2014-157621

(51) Int. Cl.
*H04N 5/225* (2006.01)
*H04N 5/21* (2006.01)
(Continued)

(52) U.S. Cl.
CPC ........... *H04N 5/211* (2013.01); *G02B 3/0056* (2013.01); *G02B 27/0018* (2013.01); *H04N 5/2254* (2013.01)

(58) Field of Classification Search
CPC ... G01N 2021/3174; G01N 2021/3177; G02B 7/16; G02B 27/0018; G02B 3/0056; H04N 2201/02493; H04N 5/211; H04N 5/2254

See application file for complete search history.

(56) References Cited

U.S. PATENT DOCUMENTS

2012/0182395 A1* 7/2012 Hiramoto ............. H04N 5/2254
348/46
2012/0182438 A1* 7/2012 Berkner .................... G01J 3/36
348/222.1

(Continued)

FOREIGN PATENT DOCUMENTS

| JP | 2012-235472 | 11/2012 |
|---|---|---|
| WO | 2012/143983 | 10/2012 |
| WO | 2013/114891 | 8/2013 |

*Primary Examiner* — Jason Flohre
(74) *Attorney, Agent, or Firm* — McDermott Will & Emery LLP

(57) ABSTRACT

An imaging apparatus includes a lens optical system including a lens, a stop, and first through nth divided optical elements in which first through nth optical regions are defined, respectively, along a plane perpendicular to an optical axis and positioned to be point-symmetric with respect to the optical axis, an image sensor, and a microlens array guiding light that has passed through the first through nth optical regions to the first through nth pixels of the image sensor, respectively. At least three of $s_1, \ldots,$ and $S_n$ are mutually different and a relation of $s_i \geq s_{i+1}$ is satisfied, where $s_1, \ldots,$ and $s_n$ represent mean luminances of images obtained from the first through nth pixels, respectively. The first optical region and the nth optical region are positioned not to be point-symmetric to each other with respect to the optical axis.

16 Claims, 12 Drawing Sheets

(51) Int. Cl.
  *G02B 27/00* (2006.01)
  *G02B 3/00* (2006.01)

(56) References Cited

U.S. PATENT DOCUMENTS

| | | | |
|---|---|---|---|
| 2012/0226480 A1* | 9/2012 | Berkner | H04N 9/045 |
| | | | 703/1 |
| 2012/0268643 A1 | 10/2012 | Imamura | |
| 2013/0235256 A1* | 9/2013 | Kodama | H04N 5/2254 |
| | | | 348/360 |
| 2013/0329042 A1* | 12/2013 | Murata | H04N 5/2254 |
| | | | 348/140 |
| 2014/0055661 A1 | 2/2014 | Imamura et al. | |
| 2015/0077617 A1* | 3/2015 | Komiya | H04N 5/2358 |
| | | | 348/336 |
| 2015/0192758 A1* | 7/2015 | Yamagata | H04N 5/2254 |
| | | | 348/360 |
| 2016/0037089 A1* | 2/2016 | Silny | H04N 5/332 |
| | | | 250/332 |

\* cited by examiner

FIG. 17A
| | IMAGE THAT INCLUDES GHOST IMAGE |
|---|---|
| TRANSMISSION WAVELENGTH BAND OF $F_{\lambda 1}$ | 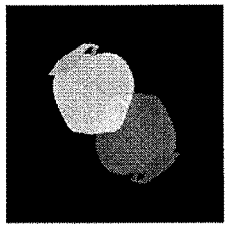 |
| TRANSMISSION WAVELENGTH BAND OF $F_{\lambda 2}$ | 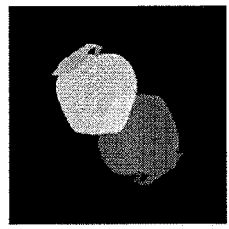 |
FIG. 17B
| | NORMAL IMAGE |
|---|---|
| TRANSMISSION WAVELENGTH BAND OF $F_{\lambda 1}$ | 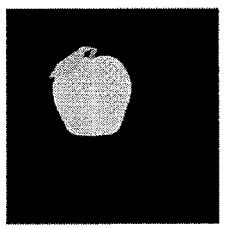 |
| TRANSMISSION WAVELENGTH BAND OF $F_{\lambda 2}$ | 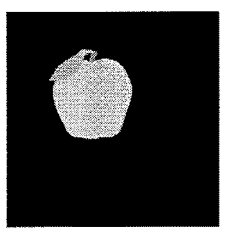 |

IMAGING APPARATUS AND ANALYZING APPARATUS

BACKGROUND

1. Technical Field

The present disclosure relates to imaging apparatuses, such as cameras, and to analyzing apparatuses that include cameras or the like.

2. Description of the Related Art

Apparatuses that capture images with different optical characteristics (e.g., wavelength, polarization, exposure) by a single imaging system through a single instance of imaging are proposed. The specification of Japanese Patent No. 5001471 discloses an embodiment of such an imaging apparatus. In this apparatus, divided regions are provided in the vicinity of a stop of a lens optical system, and elements with mutually different optical characteristics are disposed in the respective regions. A microlens array is disposed between the lens optical system and an image sensor, and light rays that have passed through the different elements in the vicinity of the stop are incident on different pixels on the image sensor.

SUMMARY

In one general aspect, the techniques disclosed here feature an imaging apparatus that includes a lens optical system, an image sensor, and a microlens array. The lens optical system includes a lens, a stop, and an optical element including first through nth divided optical elements and having first through nth optical regions, and n is an integer equal to or greater than five. The first through nth optical regions are defined in the respective first through nth divided optical elements along a plane perpendicular to an optical axis and positioned to be point-symmetric with respect to the optical axis. Light that has passed through the first through nth optical regions is incident on the image sensor including first through nth pixels. The microlens array is disposed between the lens optical system and the image sensor. The microlens array guides the light that has passed through the first through nth optical regions to the first through nth pixels, respectively; and mean luminances of images obtained from the first through nth pixels when a predetermined object is imaged under a predetermined illumination condition by using the lens optical system, the image sensor, and the microlens array are represented by $s_1, s_2, \ldots,$ and $s_n$, respectively. At least three of $s_1, s_2, \ldots,$ and $s_n$ are mutually different values, and a relation of $s_i \geq s_{i+1}$ is satisfied for any i that satisfies $1 \leq i \leq n-1$. The first optical region and the nth optical region are positioned not to be point-symmetric to each other with respect to the optical axis.

One non-limiting and exemplary embodiment provides an imaging apparatus that can obtain images with different optical characteristics with higher accuracy. In addition, a more accurate analytical value of characteristics of an object can be obtained.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 17A illustrates images captured by the conventional imaging apparatus; and

FIG. 17B illustrates normal images in the transmission wavelength band of each band-pass filter in the conventional imaging apparatus.

DETAILED DESCRIPTION

Figure 1:
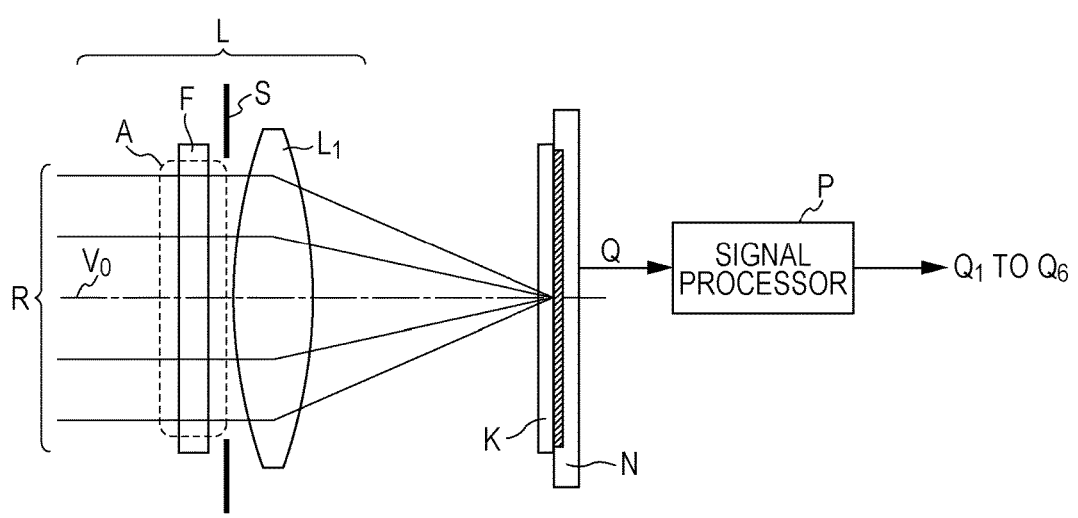
FIG. 1 is a schematic diagram illustrating a configuration of an imaging apparatus according to a first embodiment.

Underlying Knowledge Forming Basis of the Present Disclosure

The inventor of the present disclosure has studied the details of the conventional imaging apparatus disclosed in the specification of Japanese Patent No. 5001471, and has found a problem that a ghost image in a second wavelength band is mixed into an image in a first wavelength band and a ghost image in the first wavelength band is mixed into an image in the second wavelength band. Even when the number of regions (i.e., the types of band-pass filters) is increased to more than two, the mixing of a ghost image occurs.

In addition, the inventor has found a problem that, since images with different optical characteristics are mixed, even if the characteristics of an object are analyzed by using these images, the accuracy of an analytical value is insufficient. In view of such problems, the inventor of the present disclosure has inquired into what causes a ghost image to be mixed into another image, and has conceived of a novel imaging apparatus that can suppress an influence of a ghost image and obtain an accurate analytical value of an object. An overview of an aspect of the present disclosure is as follows.

An imaging apparatus according to one aspect of the present disclosure includes a lens optical system including
a lens,
a stop, and
an optical element including first through nth divided optical elements and having first through nth optical regions, n being an integer equal to or greater than five, the first through nth optical regions being defined in the respective first through nth divided optical elements along a plane perpendicular to an optical axis and positioned to be point-symmetric with respect to the optical axis;

an image sensor on which light that has passed through the first through nth optical regions is incident, the image sensor including first through nth pixels; and a microlens array disposed between the lens optical system and the image sensor, the microlens array guiding the light that has passed through the first through nth optical regions to the first through nth pixels, respectively, wherein mean luminances of images obtained from the first through nth pixels when a predetermined object is imaged under a predetermined illumination condition by using the lens optical system, the image sensor, and the microlens array are represented by $s_1, s_2, \ldots,$ and $s_n$, respectively, at least three of $s_1, s_2, \ldots,$ and $s_n$ are mutually different values, a relation of $s_i \geq s_{i+1}$ is satisfied for any i that satisfies $1 \leq i \leq n-1$, and the first optical region and the nth optical region are positioned not to be point-symmetric to each other with respect to the optical axis.

In the present disclosure, the first through nth optical regions are referred to as optical regions $AF_1, AF_2, \ldots,$ and $AF_n$, and the first through nth pixels are referred to as pixels $f_1$, pixels $f_2, \ldots,$ and pixels $f_n$. The first through nth optical regions may be defined by the stop in the respective first through nth divided optical elements.

An imaging apparatus according to another aspect of the present disclosure includes a lens optical system including
a lens,
a stop, and
an optical element including first through nth divided optical elements and having first through nth optical regions, n being an integer equal to or greater than five, the first through nth optical regions being defined in the respective first through nth divided optical elements along a plane perpendicular to an optical axis and positioned to be point-symmetric with respect to the optical axis;

an image sensor on which light that has passed through the first through nth optical regions is incident, the image sensor including first through nth pixels; and a microlens array disposed between the lens optical system and the image sensor, the microlens array guiding the light that has passed through the first through nth optical regions to the first through nth pixels, respectively, wherein areas of the first through nth optical regions are represented by $D_1, D_2, \ldots,$ and $D_n$, respectively, transmittances of the first through nth optical regions under a predetermined illumination condition are represented by $T_1, T_2, \ldots,$ and $T_n$, respectively, sensitivities in the first through nth pixels when the light that has passed through the first through nth optical regions are incident on the first through nth pixels are represented by $R_1, R_2, \ldots,$ and $R_n$, respectively, and $$B_m = D_m \times T_m \times R_m \ (m=1 \text{ through } n),$$

at least three of $B_1, B_2, \ldots,$ and $B_n$ are mutually different values, a relation of $B_i \geq B_{i+1}$ is satisfied for any i that satisfies $1 \leq i \leq n-1$, and the first optical region and the nth optical region are positioned not to be point-symmetric to each other with respect to the optical axis.

In the imaging apparatus according to the one aspect of the present disclosure, at least two of areas of the first through nth optical region may be different from each other.

In the imaging apparatus according to the other aspect of the present disclosure, at least two of areas of the first through nth optical regions may be different from each other.

In the imaging apparatus according to the one aspect of the present disclosure, at least two of the sensitivities in the first through nth pixels when the light that has passed through the first through nth optical regions are incident on the first through nth pixels may be different from each other.

In the imaging apparatus according to the other aspect of the present disclosure, at least two of $R_1, R_2, R_3,$ and $R_4$ may be different from each other.

The predetermined object may be a white reflectance standard.

The (n−1)th optical region and the nth optical region may be positioned to be point-symmetric to each other with respect to the optical axis.

The first optical region and the second optical region may be positioned to be point-symmetric to each other with respect to the optical axis.

The first optical region and the nth optical region may not be adjacent to each other.

The predetermined illumination condition may be a condition in which light is emitted from a halogen lamp.

At least one of the first through nth divided optical elements may be a band-pass filter.

A center of a transmission wavelength band of the band-pass filter may lie in a range from 700 nm to 1100 nm inclusive.

At least one of the first through nth divided optical elements may be a polarization filter.

At least one of the first through nth divided optical elements may be a neutral density (ND) filter.

An analyzing apparatus according to an aspect of the present disclosure may include any one of the imaging apparatuses described above, and a processor adapted to obtain an analytical value of the object on the basis of images that are obtained from the first through nth pixels.

The imaging apparatus that the inventor of the present disclosure has conceived of is based on the result obtained by investigating what causes a ghost image to appear. With reference to FIGS. 14 through 17B, the cause will be described, hereinafter.

Figure 14:
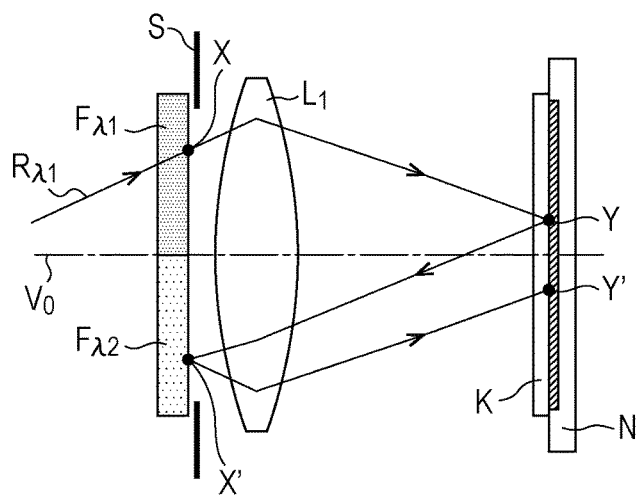
FIG. 14 illustrates a configuration of a conventional imaging apparatus and a light ray therein.

FIG. 14 illustrates an example of a light ray in the conventional imaging apparatus. According to the apparatus disclosed in the specification of Japanese Patent No. 5001471, a light ray $R_{\lambda1}$ at a wavelength of $\lambda_1$ passes through a point X on a band-pass filter $F_{\lambda1}$ (whose transmission wavelength is the wavelength $\lambda_1$) and is converged by a lens $L_1$. Then, the light ray $R_{\lambda1}$ reaches a point Y on an image sensor N through a microlens array K and is incident on a pixel corresponding to the band-pass filter $F_{\lambda1}$.

At this point, part of the light ray $R_{\lambda1}$ is reflected by the surface of the image sensor N. This reflected light ray passes through the microlens array K and the lens $L_1$ and reaches a point X' on a band-pass filter $F_{\lambda2}$. When the transmission wavelength band of the band-pass filter $F_{\lambda2}$ does not include the wavelength $\lambda_1$, part of the light ray $R_{\lambda1}$ is reflected by the surface of the band-pass filter $F_{\lambda2}$ and is converged by the lens $L_1$. Then, this part of the light ray $R_{\lambda1}$ reaches a point Y' on the image sensor N through the microlens array K and is incident on a pixel corresponding to the band-pass filter $F_{\lambda2}$. As a result, a ghost image in a first wavelength band is mixed into an image in a second wavelength band.

In the meantime, when a light ray at a wavelength $\lambda_2$ is incident on the band-pass filter $F_{\lambda2}$ (whose transmission wavelength is the wavelength $\lambda_2$), a ghost image in the second wavelength band is mixed into an image in the first wavelength band.

Figure 15:
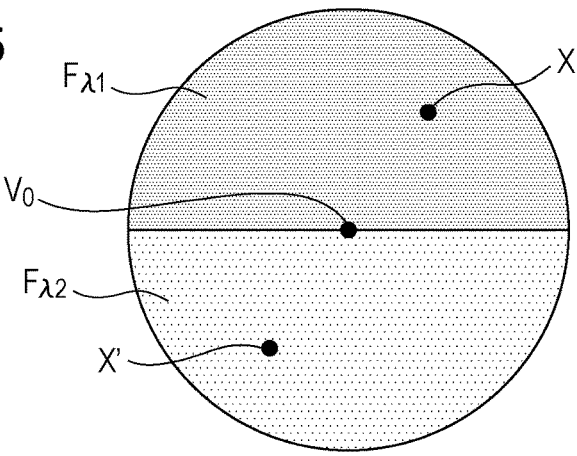
FIG. 15 illustrates a position on an optical element through which a light ray passes in the conventional imaging apparatus.

FIG. 15 illustrates a position through which the light ray $R_{\lambda1}$ passes, as viewed so as to face the band-pass filters $F_{\lambda1}$ and $F_{\lambda2}$. As illustrated in FIG. 15, the points X and X' are located so as to be point-symmetric with respect to an optical axis $V_0$. Thus, it is understood that optical elements (i.e., band-pass filters) that are disposed so as to be point-symmetric with respect to the optical axis $V_0$ contribute to the appearance of ghost images in their respective images.

Figure 16:
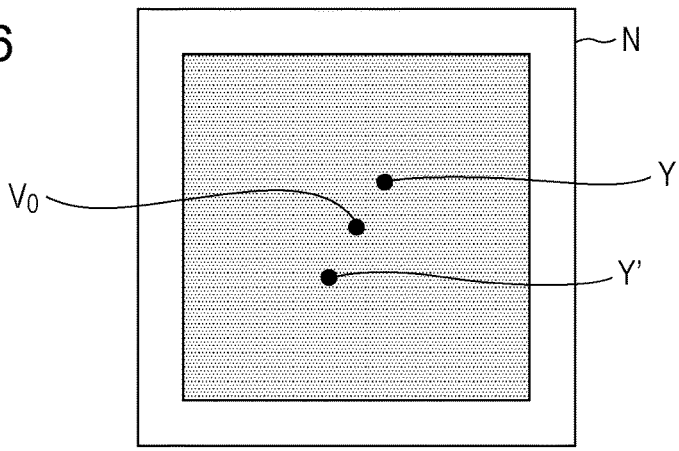
FIG. 16 illustrates positions on an image sensor on which light rays are incident in the conventional imaging apparatus.

FIG. 16 illustrates positions on which the light ray $R_{\lambda1}$ is incident, as viewed so as to face the image sensor N. As illustrated in FIG. 16, the points Y and Y' are located so as to be point-symmetric with respect to the optical axis $V_0$. Thus, it is understood that, when the center of the image sensor N coincides with the optical axis $V_0$, ghost images appear as images that are point-symmetric with respect to the center of the image.

FIG. 17A illustrates an example of images obtained by the conventional imaging apparatus, and FIG. 17B illustrates normal images for the transmission wavelength band of each band-pass filter in the conventional imaging apparatus. If there is no light ray that is reflected by the surface of the image sensor, only the normal images corresponding to the respective transmission wavelength bands can be captured, as illustrated in FIG. 17B. However, in reality, as illustrated in FIG. 17A, there is a problem in that a ghost image is mixed into an image due to the reflection by the surface of the image sensor and the reflection by optical elements disposed so as to be point-symmetric with respect to the optical axis.

The imaging apparatus according to the present disclosure solves the problem of the conventional imaging apparatus described above, and suppresses an influence of a ghost image, making it possible to obtain an accurate analytical value of an object.

Hereinafter, with reference to the drawings, embodiments of the imaging apparatus will be described in specific terms.

First Embodiment

FIG. 1 illustrates a configuration of an imaging apparatus according to a first embodiment of the present disclosure. The imaging apparatus according to the present embodiment includes a lens optical system L having an optical axis $V_0$, a microlens array K disposed in the vicinity of a focal point position of the lens optical system L, and an image sensor N.

In the present embodiment, the lens optical system L includes a stop S and an objective lens $L_1$ that images light that has passed through the stop S on the image sensor N. A region A is disposed in the vicinity of the stop S and along a plane perpendicular to the optical axis $V_0$. The size of the region A is substantially the same as the size of the stop S and is, for example, circular in shape.

The lens optical system L further includes an optical element F disposed in the region A.

Figure 2A:
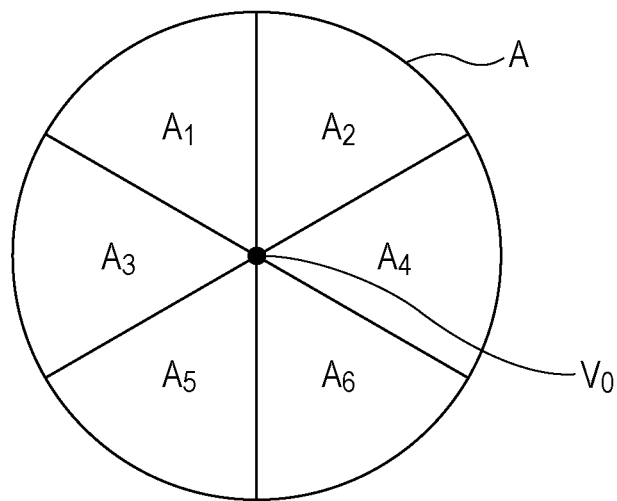
FIG. 2A is a front view of regions according to the first embodiment of the present disclosure.

FIG. 2A is a front view of the region A. As illustrated in FIG. 2A, the region A is divided into six regions $A_1$ through $A_6$. The regions $A_1$ through $A_6$ are disposed so as to be point-symmetric with respect to the optical axis $V_0$.

Figure 2B:
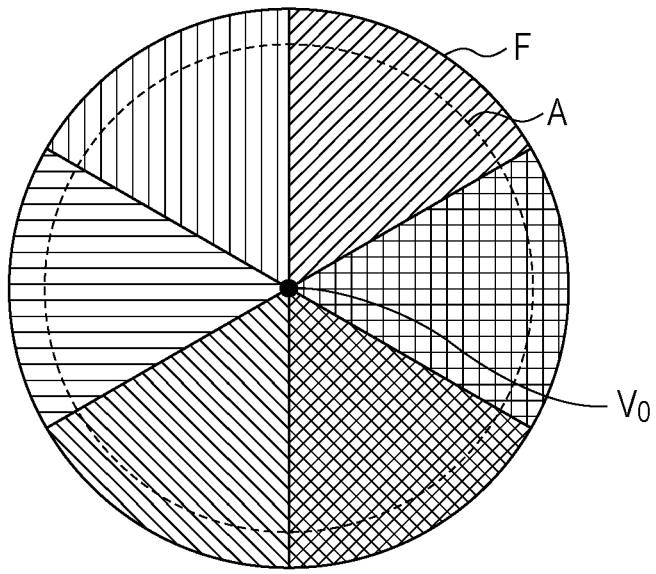
FIG. 2B is a front view of an optical element according to the first embodiment of the present disclosure.

FIG. 2B is a front view of the optical element F. The optical element F is divided into portions that are shaped so as to correspond to the shapes of the respective regions $A_1$ through $A_6$. In other words, the optical element F includes six divided optical elements. Of the six divided optical elements, at least three divided optical elements have mutually different optical characteristics. Each of the divided optical elements has substantially uniform optical characteristics. As illustrated in FIGS. 1 and 2B, the size of the optical element F may be greater than the size of the region A (i.e., part of the optical element F overlaps the stop S).

In the present embodiment, the optical element F has mutually different transmission wavelength band characteristics in the regions $A_1$ through $A_6$. To be more specific, the divided optical elements located in the respective regions $A_1$ through $A_6$ are band-pass filters with mutually different transmission wavelength bands. The divided optical elements may be polarization filters or neutral density (ND) filters. In other words, the optical characteristics being different means that at least one selected from the group of the transmission wavelength band, the polarization characteristics, and the transmittance differs among the regions $A_1$ through $A_6$.

A band-pass filter obtained, for example, by depositing a dielectric multilayer film on an optical glass substrate can be used. The band-pass filters with different optical characteristics may be fabricated, for example, through a method in which dielectric multilayer films with different constitutions are deposited on substrates shaped so as to correspond to the shapes of the respective regions (sector shape in the present embodiment) and the substrates are then arranged to form a circle. Regardless of a fabrication method, the optical characteristics of portions near the boundaries of the regions are likely to fall outside the desired optical characteristics, and thus the portions near the boundaries of the regions $A_1$ through $A_6$ may be covered by light-blocking zones.

Light rays R that enter the stop S pass through any one of the regions $A_1$ through $A_6$ (i.e., the optical element F) illustrated in FIG. 2A and is converged by the lens $L_1$. Then, the light rays R pass through the microlens array K and are incident on the image sensor N.

Figure 3:
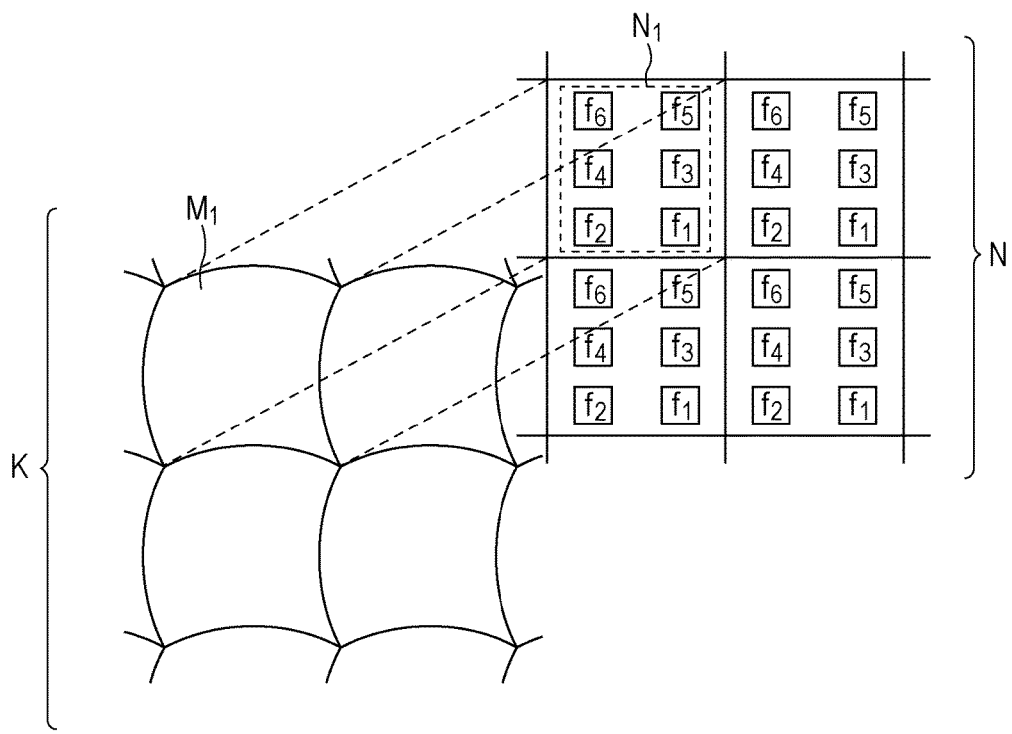
FIG. 3 is an enlarged view of a microlens array and an image sensor according to the first embodiment.

FIG. 3 is an enlarged view of the image sensor N, as viewed so as to face the image sensor N, and illustrates a positional relation between the image sensor N and the microlens array K. The microlens array K includes micro-optical components $M_1$ each having a lens surface. The image sensor N includes pixels $f_1$, pixels $f_2$, pixels $f_3$, pixels $f_4$, pixels $f_5$, and pixels $f_6$. As illustrated in FIG. 3, the pixels $f_6$, $f_4$, and $f_2$ or the pixels $f_5$, $f_3$, and $f_1$ are arrayed periodically in the vertical direction of FIG. 3. In addition, the pixels $f_6$ and $f_5$, the pixels $f_4$ and $f_3$, or the pixels $f_2$ and $f_1$ are arrayed in an alternating manner in the horizontal direction of FIG. 3. In this manner, pixels from the respective pixels $f_1$ through $f_6$ are disposed closely to form a pixel group $N_1$. The pixel group $N_1$ corresponds to a single micro-optical component $M_1$ in the microlens array K.

Figure 4:
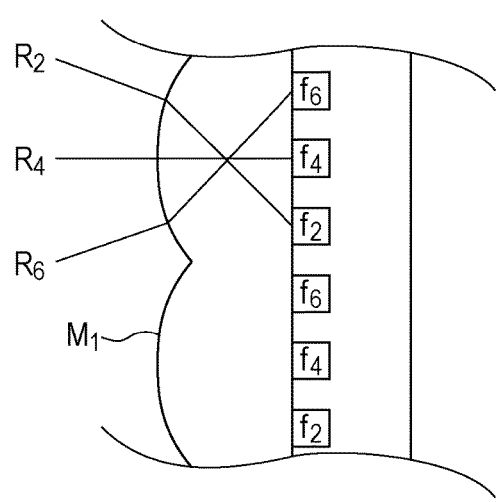
FIG. 4 is an enlarged sectional view of the microlens array and the image sensor according to the first embodiment.

FIG. 4 is an enlarged sectional view of the microlens array K and the image sensor N illustrated in FIG. 1.

As illustrated in FIG. 4, in each micro-optical component $M_1$, of the light rays R that have entered the stop S, large part of a light ray $R_2$ that has passed through the region $A_2$ is incident on one of the pixels $f_2$, large part of a light ray $R_4$ that has passed through the region $A_4$ is incident on one of the pixels $f_4$, and large part of a light ray $R_6$ that has passed through the region $A_6$ is incident on one of the pixels $f_6$. In a similar manner, large part of light rays that have passed through the respective regions $A_1$, $A_3$, and $A_5$ are incident on a corresponding one of the pixels $f_1$, $f_3$, or $f_5$.

The image sensor N subjects the light rays incident on the pixels $f_1$ through $f_6$ to photoelectric conversion, and transmits an image signal Q to a signal processor P, as illustrated in FIG. 1. The signal processor P generates an image $Q_1$ that is based on the pixels $f_1$ and an image $Q_2$ that is based on the pixels $f_2$ on the basis of the image signal Q. Images $Q_3$ through $Q_6$ are also generated in a similar manner.

In this manner, the images that are based on the light rays that have passed through the respective regions $A_1$ through $A_6$ can be obtained. Although the images $Q_1$ through $Q_6$ include parallaxes occurring due to the differences among the positions of the regions $A_1$ through $A_6$, the images $Q_1$ through $Q_6$ are substantially images obtained by imaging the same object simultaneously. Imaging simultaneously as used herein means that the light rays for forming the images $Q_1$ through $Q_6$ are obtained simultaneously. The signal processor P does not need to generate the images $Q_1$ through $Q_6$ simultaneously.

Although a mode in which six pixels from the respective pixels $f_1$ through $f_6$ are disposed closely so as to form the pixel group $N_1$ is illustrated in the example described above, the configuration is not limited thereto. For example, the pixel group $N_1$ may be formed by 6n pixels (n is an integer equal to or greater than two). In this case, in each micro-optical component $M_1$, of the light rays R that have entered the stop S, large part of the light ray $R_2$ that has passed through the region $A_2$ is incident on the n pixels $f_2$, large part of the light ray $R_4$ that has passed through the region $A_4$ is incident on the n pixels $f_4$, and large part of the light ray $R_6$ that has passed through the region $A_6$ is incident on the n pixels $f_6$. In a similar manner, large part of the light rays that have passed through the respective regions $A_1$, $A_3$, and $A_5$ are incident on the corresponding one of the n pixels $f_1$, $f_3$, and $f_5$.

Figure 5:
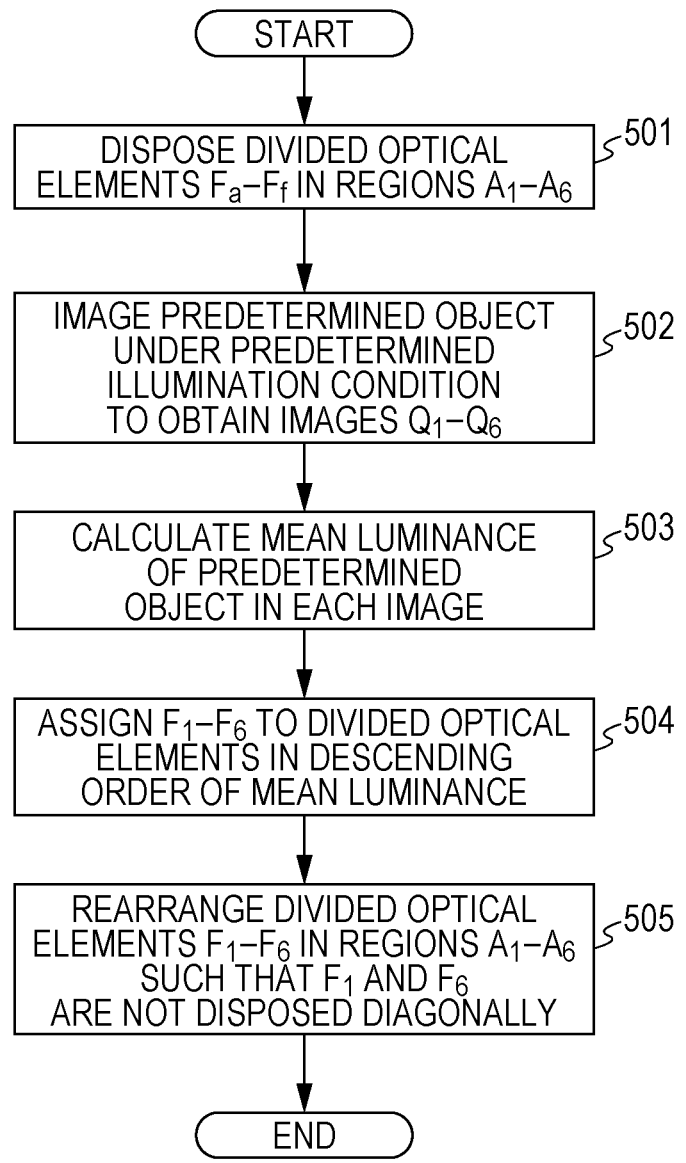
FIG. 5 is a flowchart for describing a method for determining an arrangement of divided optical elements according to the first embodiment.

Subsequently, a method for determining an arrangement of the divided optical elements in the regions $A_1$ through $A_6$ will be described with reference to the flowchart illustrated in FIG. 5.

Figure 6:
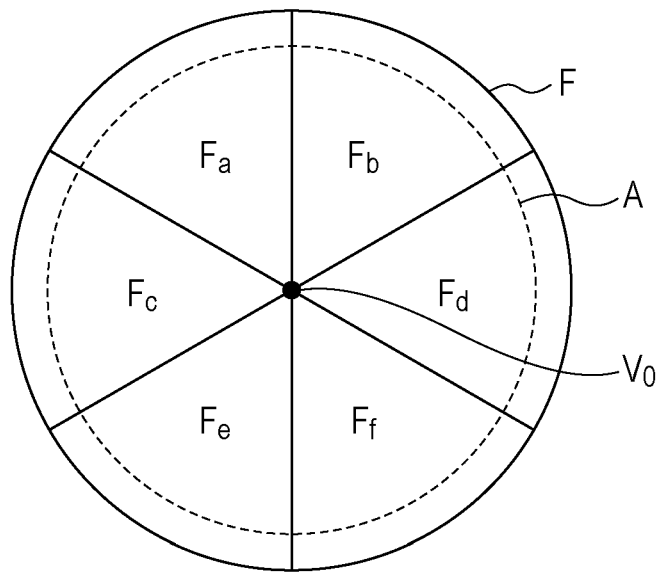
FIG. 6 illustrates an arrangement of divided optical elements held before the arrangement of the divided optical elements is determined according to the first embodiment.

The six divided optical elements are represented by $F_a$, $F_b$, $F_c$, $F_d$, $F_e$, and $F_f$. In a disposing step 501, the divided optical elements $F_a$ through $F_f$ are disposed in the regions $A_1$ through $A_6$ in the imaging apparatus, as illustrated in FIG. 6 (also refer to FIG. 2A).

In an imaging step 502, a predetermined object is imaged by the imaging apparatus under a predetermined illumination condition, and the images $Q_1$ through $Q_6$ are obtained. An illumination with an optical spectrum that is the same as the optical spectrum of an illumination in an environment in which the imaging apparatus is actually used may be used as the predetermined illumination, which makes it possible to determine the arrangement in the optical element F more accurately. In addition, a halogen lamp may be used as the predetermined illumination. A halogen lamp has a relatively smooth optical spectrum from a visible light band through a near-infrared band, and thus the halogen lamp offers an advantage in that an analysis in these bands can be facilitated.

In addition, a white reflectance standard may be used as the predetermined object. A white reflectance standard is a diffuse reflector that has substantially uniform reflectance (e.g., 100%) across a wavelength band to be imaged. When a white reflectance standard is used, there is an advantage in that an influence of a ghost image is minimized on average when various objects with different spectral reflection characteristics, serving as actual targets of analysis, are imaged. It is to be noted that, when the spectral reflectance characteristics of actual targets of analysis are substantially the same, the target of analysis may be used as the predetermined object in place of the white reflectance standard.

In a calculation step 503, portions corresponding to the predetermined object are extracted from the obtained images $Q_1$ through $Q_6$, and a mean luminance of each of these portions is calculated. To calculate the mean luminance more accurately, a portion in which a ghost image overlaps may be excluded from the portion corresponding to the predetermined object.

Alternatively, in order to prevent a ghost image from appearing, an image captured while regions other than the region corresponding to an image to be obtained are shielded may be used (e.g., when the image $Q_1$ is to be obtained, the regions $A_2$, $A_3$, $A_4$, $A_5$, and $A_6$ are shielded).

After steps 501 through 503 are carried out, a relation between the regions $A_1$ through $A_6$ and the mean luminances of the images of the predetermined object obtained from the light rays that have passed through the divided optical elements corresponding to the regions $A_1$ through $A_6$ is obtained as indicated in Table 1. It is to be noted that the calculated values of the mean luminances indicated in Table 1 are an example of the present embodiment.

TABLE 1

| Regions | Divided Optical Elements | Pixels Corresponding to Regions | Images | Calculated Values of Mean Luminances (Example) |
|---|---|---|---|---|
| $A_1$ | $F_a$ | $f_1$ | $Q_1$ | 100 |
| $A_2$ | $F_b$ | $f_2$ | $Q_2$ | 80 |
| $A_3$ | $F_c$ | $f_3$ | $Q_3$ | 60 |
| $A_4$ | $F_d$ | $f_4$ | $Q_4$ | 40 |
| $A_5$ | $F_e$ | $f_5$ | $Q_5$ | 30 |
| $A_6$ | $F_f$ | $f_6$ | $Q_6$ | 20 |

In a numbering step 504, the divided optical elements $F_a$ through $F_f$ corresponding to the calculated mean luminances are rearranged and numbered in descending order of the mean luminances. In other words, when the order of the mean luminances is expressed in symbols as in $s_1 > s_2 > s_3 > s_4 > s_5 > s_6$, the corresponding divided optical elements are numbered as in $F_1, F_2, \ldots,$ and $F_6$. Consequently, the divided optical elements $F_a$ through $F_f$ can be numbered as the divided optical elements $F_1$ through $F_6$, as indicated in Table 2.

TABLE 2

| Regions | Divided Optical Elements | Mean Luminances Expressed in Symbols in Descending Order of Luminances | Numbered Divided Optical Elements |
|---|---|---|---|
| $A_1$ | $F_a$ | $s_1$ | $F_1$ |
| $A_2$ | $F_b$ | $s_2$ | $F_2$ |
| $A_3$ | $F_c$ | $s_3$ | $F_3$ |
| $A_4$ | $F_d$ | $s_4$ | $F_4$ |
| $A_5$ | $F_e$ | $s_5$ | $F_5$ |
| $A_6$ | $F_f$ | $s_6$ | $F_6$ |

Figure 7:
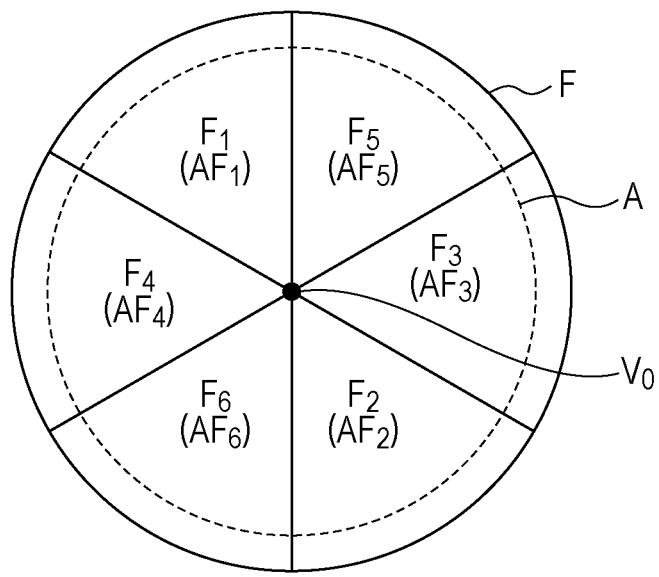
FIG. 7 illustrates an arrangement of divided optical elements according to the first embodiment.

In a rearrangement step 505, the divided optical elements $F_1$ through $F_6$ are rearranged in the regions $A_1$ through $A_6$ illustrated in FIG. 2A such that at least the divided optical element $F_1$ (i.e., divided optical element with the highest mean luminance) and the divided optical element $F_6$ (i.e., divided optical element with the lowest mean luminance) are disposed so as not to be point-symmetric with respect to the optical axis $V_0$. An example in which the divided optical elements $F_1$ through $F_6$ have been rearranged is illustrated in FIG. 7. The regions $A_1$ through $A_6$ in which the divided optical elements $F_1$ through $F_6$ have been rearranged are referred to, respectively, as optical regions $AF_1$ through $AF_6$, which have optical characteristics of the divided optical elements $F_1$ through $F_6$. When the light rays that have passed through the optical regions $AF_1$ through $AF_6$ are incident on the respective pixels $f_1$ through $f_6$; the divided optical elements rearranged in the regions $A_1$ through $A_6$, the optical regions $AF_1$ through $AF_6$, the corresponding pixels, and the mean luminances represented by the symbols hold a relation as indicated in Table 3. In this case, the pixels $f_1$ through $f_6$ correspond to the pixels $f_1, f_6, f_4, f_3, f_2,$ and $f_5$ in each pixel group illustrated in FIG. 3.

TABLE 3

| Regions | Rearranged Divided Optical Elements | Optical Regions | Pixels Corresponding to Optical Regions | Mean Luminances Expressed in Symbols in Descending Order of Luminances |
|---|---|---|---|---|
| $A_1$ | $F_1$ | $AF_1$ | $f_1$ | $s_1$ |
| $A_2$ | $F_5$ | $AF_5$ | $f_5$ | $s_5$ |
| $A_3$ | $F_4$ | $AF_4$ | $f_4$ | $s_4$ |
| $A_4$ | $F_3$ | $AF_3$ | $f_3$ | $s_3$ |
| $A_5$ | $F_6$ | $AF_6$ | $f_6$ | $s_6$ |
| $A_6$ | $F_2$ | $AF_2$ | $f_2$ | $s_2$ |

As described thus far, the configuration of the imaging apparatus according to the present embodiment is such that an optical region in which a light ray is incident on pixels from which an image with the highest mean luminance can be obtained when the divided optical elements are disposed so as to be point-symmetric with respect to the optical axis and a predetermined object is imaged under a predetermined illumination condition and another optical region in which a light ray is incident on pixels from which an image with the lowest mean luminance can be obtained when the divided optical elements are disposed so as to be point-symmetric with respect to the optical axis and the predetermined object is imaged under the predetermined illumination condition are disposed so as not to be point-symmetric with respect to the optical axis. FIG. 7 illustrates an example of such an arrangement of the divided optical elements and the optical regions.

Subsequently, the extent by which an influence of a ghost image can be reduced by rearranging the divided optical elements as described above will be described on the basis of a calculation.

Figure 8:
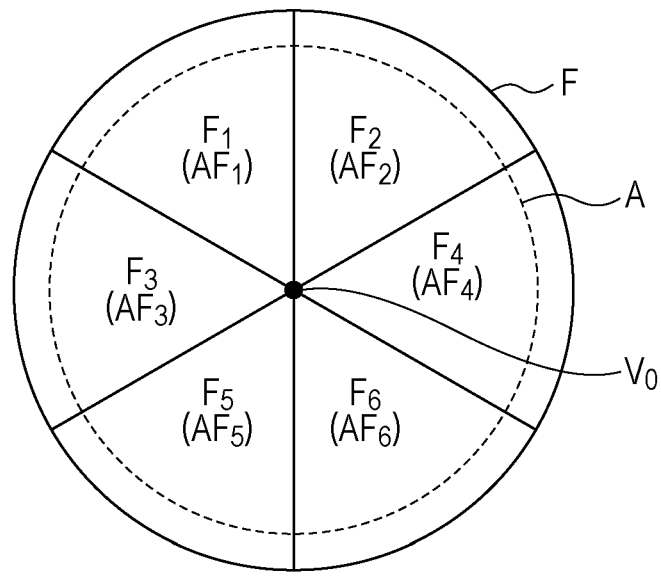
FIG. 8 illustrates a conventional arrangement of divided optical elements according to a comparative example.

As a conventional comparative example, an arrangement of divided optical elements as illustrated in FIG. 8 (i.e., an arrangement of divided optical elements before the divided optical elements are rearranged in the present embodiment) is given. In this comparative example, the divided optical element $F_1$ in which the highest mean luminance is obtained when the predetermined object is imaged under the predetermined illumination condition and the divided optical element $F_6$ in which the lowest mean luminance is obtained are disposed so as to be point-symmetric.

For now, suppose that certain divided optical elements $F_\alpha$ and $F_\beta$ ($\alpha$ and $\beta$ are integers that are each equal to or greater than 1 and equal to or less than the number of regions) are disposed so as to be point-symmetric with respect to the optical axis, with the mixing of ghost images into each other occurring due to these divided optical elements taken into consideration, the mixing rate of a ghost image is defined by (the mean luminance of a ghost image÷the mean luminance of a normal image). The quantity of light that is incident on the image sensor N after having passed through the divided optical element $F_\alpha$ is represented by $P_\alpha$; the quantity of light that is incident on the image sensor N after having passed through the divided optical element $F_\beta$ is represented by $P_\beta$; the sensitivity of the image sensor N to the light that has passed through the divided optical element $F_\alpha$ is represented by $R_\alpha$; and the sensitivity of the image sensor N to the light that has passed through the divided optical element $F_\beta$ is represented by $R_\beta$. In this case, the mixing rate $Mx(F_\alpha, F_\beta)$ of a ghost image in an image corresponding to the divided optical element $F_\alpha$ is expressed as follows.

$$Mx(F_\alpha, F_\beta) = \frac{P_\beta \times C \times R_\beta}{P_\alpha \times R_\alpha} \quad (1)$$

Here, C represents an occurrence rate of a ghost image (i.e., the reflectance of the surface of the image sensor×the reflectance of the optical element).

The mean luminance of a normal image in an image corresponding to the divided optical element $F_\alpha$ is represented by $s_\alpha$, and the mean luminance of a normal image in an image corresponding to the divided optical element $F_\beta$ is represented by $s_\beta$. In this case, the luminance of an image can be expressed by a product of the quantity of light and the sensitivity, and thus $Mx(F_\alpha, F_\beta)$ in Expression 1 can be expressed as in the following expression.

$$Mx(F_\alpha, F_\beta) = \frac{s_\beta \times C}{s_\alpha} \quad (2)$$

In a similar manner, the mixing rate $Mx(F_\beta, F_\alpha)$ of a ghost image in an image corresponding to the divided optical element $F_\beta$ is expressed as follows.

$$Mx(F_\beta, F_\alpha) = \frac{P_\alpha \times C \times R_\alpha}{P_\beta \times R_\beta} = \frac{s_\alpha \times C}{s_\beta} \quad (3)$$

Table 4 indicates a result obtained by calculating the mixing rate of a ghost image arising in the arrangement of the divided optical elements according to the present embodiment (i.e., the arrangement illustrated in FIG. 7), while the occurrence rate of a ghost image is tentatively set to C=0.2.

TABLE 4

| Optical Regions | Divided Optical Element $F_\alpha$ | Divided Optical Element $F_\beta$ Disposed Point-Symmetrically | $s_\alpha$ | $s_\beta$ | $Mx(F_\alpha, F_\beta)$ |
|---|---|---|---|---|---|
| $AF_1$ | $F_1$ | $F_2$ | 100 | 80 | 0.16 |
| $AF_2$ | $F_2$ | $F_1$ | 80 | 100 | 0.25 |
| $AF_3$ | $F_3$ | $F_4$ | 60 | 40 | 0.13 |
| $AF_4$ | $F_4$ | $F_3$ | 40 | 60 | 0.30 |
| $AF_5$ | $F_5$ | $F_6$ | 30 | 20 | 0.13 |
| $AF_6$ | $F_6$ | $F_5$ | 20 | 30 | 0.30 |
| Sum of Squares of $Mx(F_\alpha, F_\beta)$ | | | | | 0.30 |

If the images from all the divided optical elements are to be used equally in analyzing the object, an influence of the ghost image on the accuracy of the analytical value of the object can be estimated by a value obtained by squaring the mixing rate $Mx(F_\beta, F_\alpha)$ of a ghost image corresponding to each of the divided optical elements and adding the squares. The value obtained by calculating the sum of squares is 0.30.

Meanwhile, Table 5 indicates a result for the conventional comparative example, obtained through a similar calculation.

TABLE 5

| Optical Regions | Divided Optical Element $F_\alpha$ | Divided Optical Element $F_\beta$ Disposed Point-Symmetrically | $s_\alpha$ | $s_\beta$ | $Mx(F_\alpha, F_\beta)$ |
|---|---|---|---|---|---|
| $AF_1$ | $F_1$ | $F_6$ | 100 | 20 | 0.04 |
| $AF_2$ | $F_2$ | $F_5$ | 80 | 30 | 0.08 |
| $AF_3$ | $F_3$ | $F_4$ | 60 | 40 | 0.13 |
| $AF_4$ | $F_4$ | $F_3$ | 40 | 60 | 0.30 |
| $AF_5$ | $F_5$ | $F_2$ | 30 | 80 | 0.53 |
| $AF_6$ | $F_6$ | $F_1$ | 20 | 100 | 1.00 |
| Sum of Squares of $Mx(F_\alpha, F_\beta)$ | | | | | 1.40 |

In the comparative example, the sum of squares is 1.40, which is 4.7 times greater than the sum of squares of the mixing rate according to the present embodiment. Therefore, with the arrangement of the divided optical elements and the optical regions described in the present embodiment, an influence of the mixing of a ghost image can be reduced as compared with the comparative example, and consequently it is possible to say that the accuracy of the analytical value of the object can be increased.

The point of the present embodiment lies in that the divided optical element and the optical region corresponding to an image with the highest mean luminance and the divided optical element and the optical region corresponding to an image with the lowest mean luminance are disposed so as not to be point-symmetric with respect to the optical axis.

A reason why such an arrangement is preferable will be described qualitatively. When a ghost image with the highest mean luminance is mixed into a normal image with the lowest mean luminance, the mixing rate is maximized, and an error of analysis occurring when the characteristics of the object are analyzed from that image also increases. Meanwhile, even when a ghost image with a relatively high mean luminance is mixed into a normal image with a high mean luminance, the mixing rate does not become high. Thus, an error occurring when the characteristics of the object are analyzed from that image is likely to fall within a permissible range.

In addition, when the feature of the present embodiment is further generalized, it can be said that two optical regions (two types of divided optical elements) in which light rays are incident on pixels from which images with a large difference in the mean luminance are obtained are disposed so as not to be point-symmetric with respect to the optical axis $V_0$. When this feature is viewed from another perspective, it can also be said that two optical regions (two types of divided optical elements) in which light rays are incident on pixels from which images with close mean luminances are obtained are disposed so as to be point-symmetric with respect to the optical axis $V_0$. That is, when the two optical regions (two types of divided optical elements) corresponding to the images with a large difference in the mean luminance are disposed so as not to be point-symmetric with respect to the optical axis $V_0$, the two optical regions (divided optical elements) corresponding to the images with close mean luminances are disposed so as to be point-symmetric with respect to the optical axis $V_0$, as a result.

Therefore, when there are six regions as in the present embodiment, modes of the arrangement of the divided optical elements $F_1$ through $F_6$ and the optical regions $AF_1$ through $AF_6$, which are disposed so as to be point-symmetric with respect to the optical axis $V_0$, are as follows. The arrangement illustrated in FIG. 7 satisfies all of these conditions.

(1) $F_1$ and $F_6$ ($AF_1$ and $AF_6$) are disposed so as not to be point-symmetric with respect to the optical axis $V_0$.

(2) $F_1$ and $F_2$ ($AF_1$ and $AF_2$) may be disposed so as to be point-symmetric with respect to the optical axis $V_0$.

(3) $F_5$ and $F_6$ ($AF_5$ and $AF_6$) may be disposed so as to be point-symmetric with respect to the optical axis $V_0$.

Another mode in the present embodiment is that the divided optical elements $F_1$ and $F_6$ (i.e., the optical regions $AF_1$ and $AF_6$) are disposed so as not to be adjacent to each other. A reason therefor is that part of light that has passed through a given region is incident, as a crosstalk component, on pixels corresponding to an adjacent region. If the divided optical elements $F_1$ and $F_6$ are adjacent to each other, part of the light that has passed through $F_1$ is incident on the pixels $f_6$ corresponding to $F_6$. An image corresponding to $F_6$ has the lowest mean luminance, and an image corresponding to $F_1$ has the highest mean luminance. Therefore, an influence of crosstalk on the image corresponding to $f_6$ is maximized, and the accuracy of the analytical value of the object decreases. Accordingly, the divided optical elements $F_1$ and $F_6$ may be disposed so as not to be adjacent to each other. It is to be noted that, in the arrangement of the divided optical elements illustrated in FIG. 7, $F_1$ and $F_6$ are disposed so as not to be adjacent to each other.

As described thus far, according to the embodiment of the present disclosure, the divided optical element corresponding to an image with the highest mean luminance and the divided optical element corresponding to an image with the lowest mean luminance are disposed so as not to be point-symmetric with respect to the optical axis $V_0$. This configuration makes it possible to suppress an influence of a ghost image, and an accurate analytical value of an object can thus be obtained.

Second Embodiment

Figure 9:
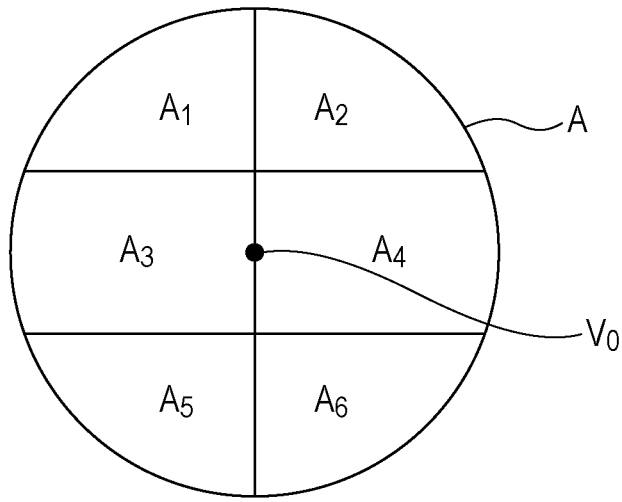
FIG. 9 is a front view of regions according to a second embodiment.
Figure 10:
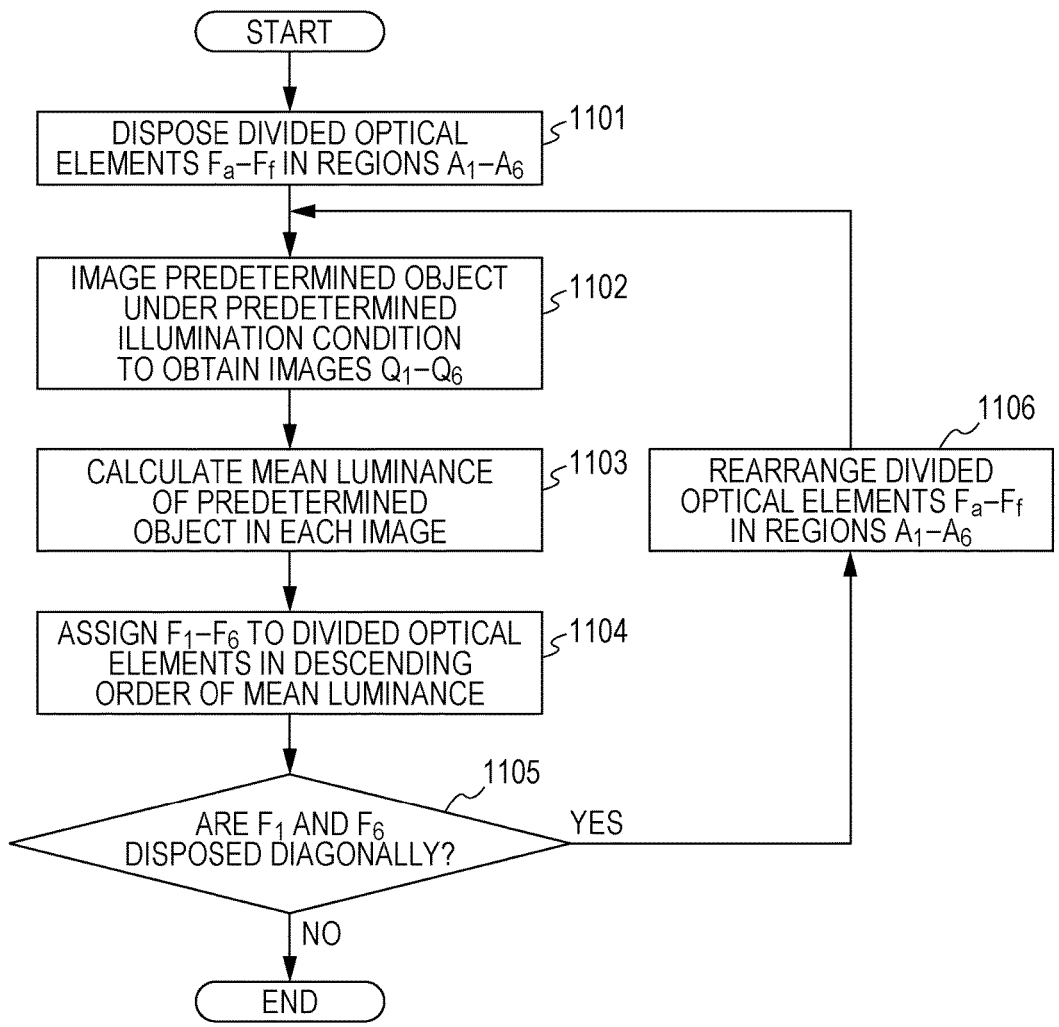
FIG. 10 is a flowchart for describing a method for determining an arrangement of divided optical elements according to the second embodiment.

Although the arrangement of the divided optical elements in a case in which the areas of the regions are equal to one another has been described in the first embodiment above, the areas may differ among the regions. For example, in a region A illustrated in FIG. 9, the areas of $A_3$ and $A_4$ are different from the areas of $A_1$, $A_2$, $A_5$, and $A_6$. When the areas of the divided regions differ, depending on where a divided optical element is disposed, the mean luminance of an image corresponding to that divided optical element varies. A method for determining an arrangement of divided optical elements in such a case will be described with reference to a flowchart illustrated in FIG. 10.

Figure 11:
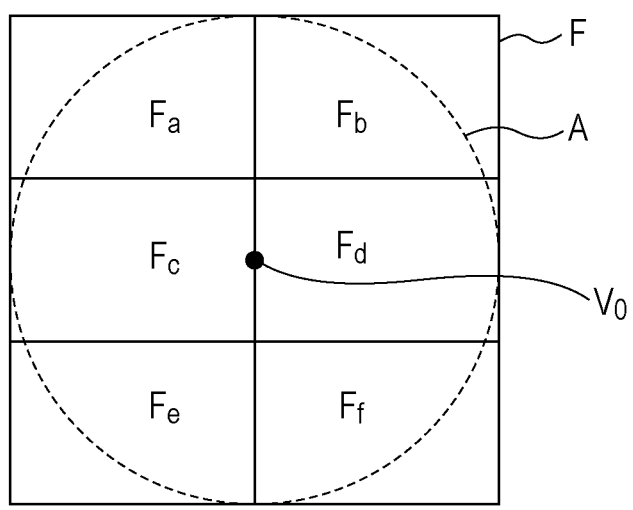
FIG. 11 illustrates an arrangement of divided optical elements held before the arrangement of the divided optical elements is determined according to the second embodiment.

As in the first embodiment, six divided optical elements are represented by $F_a$, $F_b$, $F_c$, $F_d$, $F_e$, and $F_f$. In a disposing step 1101, the divided optical elements $F_a$ through $F_f$ are disposed in the region A in the imaging apparatus, as illustrated in FIG. 11.

In an imaging step 1102, a predetermined object is imaged by the imaging apparatus under a predetermined illumination condition, and images $Q_1$ through $Q_6$ are obtained. In a calculation step 1103, portions corresponding to the predetermined object are extracted from the obtained images $Q_1$ through $Q_6$, and the mean luminance of each portion is calculated. In a numbering step 1104, the divided optical elements $F_a$ through $F_f$ corresponding to the calculated mean luminances are rearranged and numbered in descending order of the mean luminance. Up to this point, the processes are similar to those of the first embodiment.

In a determination step 1105, it is determined whether the divided optical elements $F_1$ and $F_6$ are disposed so as to be point-symmetric with respect to the optical axis $V_0$. If the divided optical elements $F_1$ and $F_6$ are disposed so as to be point-symmetric, in a rearrangement step 1106, the divided optical elements $F_a$ through $F_f$ are rearranged in the regions $A_1$ through $A_6$ in a pattern different from the previous pattern. Thereafter, the imaging step 1102 through the determination step 1105 are repeated. The process is terminated when the divided optical element $F_1$ and the divided optical element $F_6$ are disposed so as not to be point-symmetric.

Figure 12A:
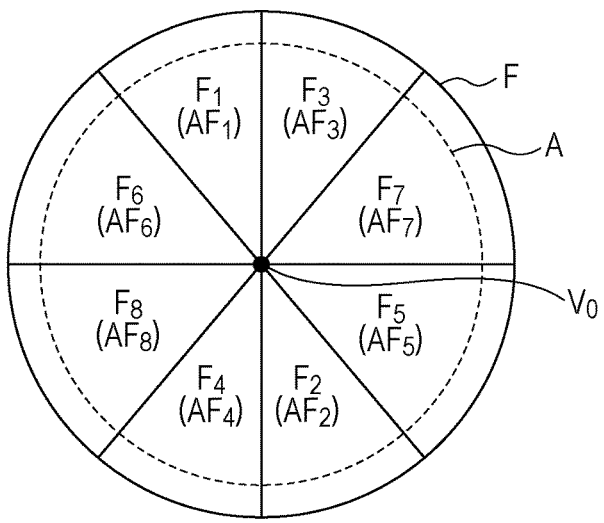
FIG. 12A illustrates an arrangement of divided optical elements according to another embodiment.
Figure 12B:
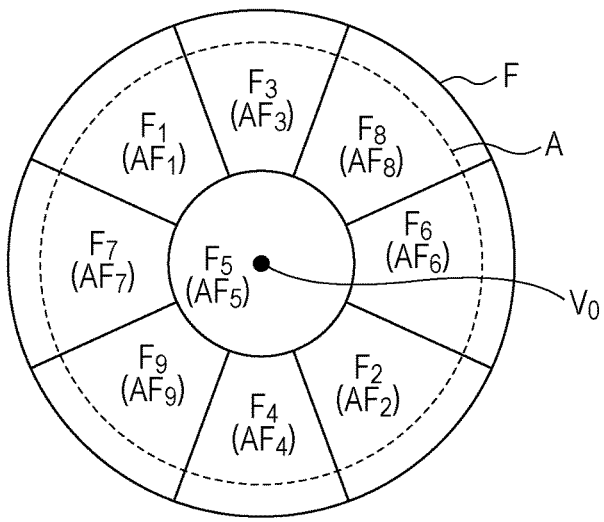
FIG. 12B illustrates an arrangement of divided optical elements according to yet another embodiment.
Figure 12C:
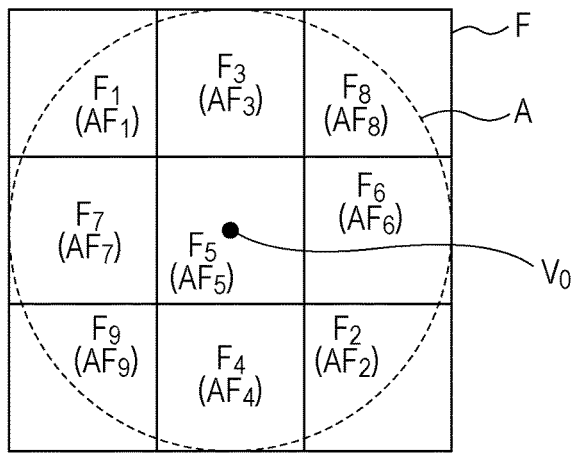
FIG. 12C illustrates an arrangement of divided optical elements according to yet another embodiment.

Although the number of regions in the embodiments described above is six, the number of regions may be other than six as long as a divided optical element corresponding to an image with the highest mean luminance and another divided optical element corresponding to an image with the lowest mean luminance can be disposed so as not to be point-symmetric. In a case in which a divided optical element corresponding to an image with the highest mean luminance and another divided optical element corresponding to an image with the lowest mean luminance are disposed so as not to be point-symmetric with respect to the optical axis $V_0$ and so as not to be adjacent to each other in order to prevent an influence of a crosstalk component as described above, the number of regions may be six or more. As another embodiment in which the number of regions is six or more, an example of the arrangement of divided optical elements and optical regions when the number of regions is eight is illustrated in FIG. 12A. In addition, examples of the arrangements of divided optical elements and optical regions when the number of regions is nine are illustrated in FIGS. 12B and 12C.

An arrangement of divided optical elements in a case in which the number of regions is n and the divided optical elements are numbered as $F_1, F_2, \ldots, F_n$ in order of the mean luminances is generalized as follows.

(1) $F_1$ and $F_n$ ($AF_1$ and $AF_n$) are disposed so as not to be point-symmetric with respect to the optical axis $V_0$.
(2) $F_1$ and $F_2$ ($AF_1$ and $AF_2$) may be disposed so as to be point-symmetric with respect to the optical axis $V_0$.
(3) $F_{n-1}$ and $F_n$ ($AF_{n-1}$ and $AF_n$) may be disposed so as to be point-symmetric with respect to the optical axis $V_0$.

Figure 13A:
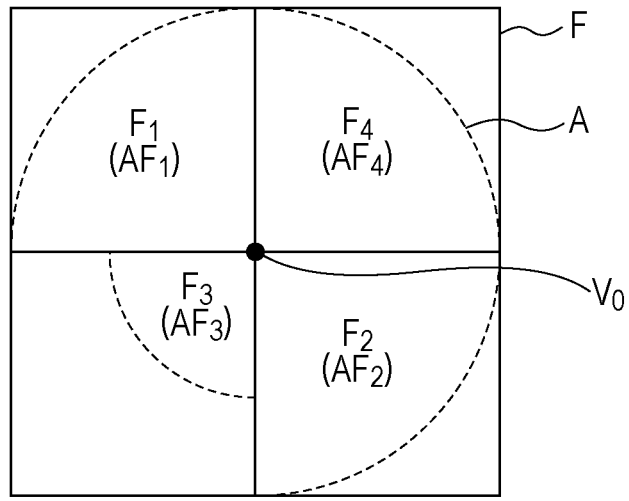
FIG. 13A illustrates an arrangement of divided optical elements according to yet another embodiment.
Figure 13B:
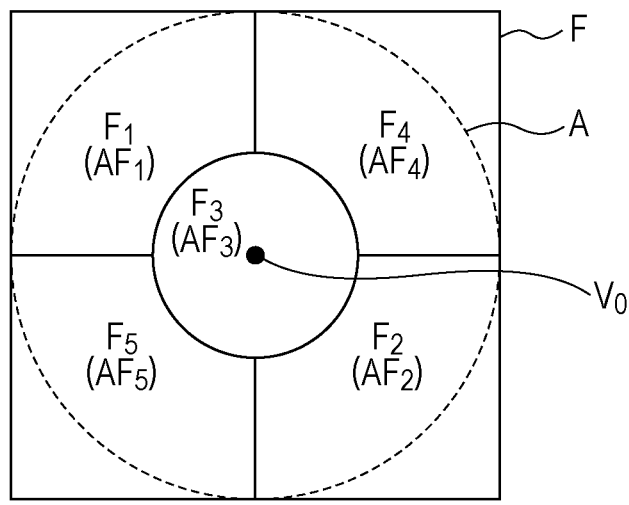
FIG. 13B illustrates an arrangement of divided optical elements according to yet another embodiment.

Alternatively, the number of regions may be five. In this case, it is not possible to dispose the divided optical element $F_1$ and the divided optical element $F_n$ so as not to be point-symmetric with respect to the optical axis $V_0$ and so as not to be adjacent to each other, and thus disposing the divided optical element $F_1$ and the divided optical element $F_n$ so as not to be point-symmetric takes a priority, as illustrated in FIG. 13B. Here, at least two of the sensitivities of the image sensor to light rays that have passed through the respective divided optical elements may be different from each other. Alternatively, as illustrated in FIG. 13B, at least two of the areas of the respective regions may be different from each other. For example, in FIG. 13B, the area of the region corresponding to $F_3$ is different from the areas of the other regions. In any case, an effect of suppressing an influence of a ghost image and obtaining an accurate analytical value of an object can be achieved. As another alternative, as illustrated in FIG. 13A, the number of regions may be four, and at least two of the areas of the respective regions may be different from each other. For example, in FIG. 13A, the area of the region corresponding to $F_3$ is different from the areas of the other regions. Furthermore, at least two of the sensitivities of the image sensor to light rays that have passed through the respective divided optical elements may be different from each other. In this case as well, an effect of suppressing an influence of a ghost image and obtaining an accurate analytical value of an object can be achieved.

In addition, although the mean luminances of the images corresponding to the six optical regions are mutually different in the first embodiment described above, as long as there are at least three different mean luminances, it is possible to dispose an optical region (divided optical element) in which a light ray is incident on pixels from which an image with the highest mean luminance is obtained and another optical region (divided optical element) in which a light ray is incident on pixels from which an image with the lowest mean luminance is obtained so as not to be point-symmetric. Through this configuration, an effect of suppressing an influence of a ghost image and obtaining an accurate analytical value of an object can be achieved.

Although the method for determining an arrangement of the divided optical elements $F_1$ through $F_6$ on the basis of the mean luminances $s_1, s_2, \ldots,$ and $s_6$ of the images obtained by imaging the predetermined object under the predetermined illumination condition has been described in the embodiment above, another method that allows mean luminances of images to be estimated may be used. For example, the transmittance of a divided optical element under the predetermined illumination condition is represented by T; the area of a region corresponding to the divided optical element is represented by D; and the sensitivity of the image sensor to the light that has passed through the divided optical element is represented by R. In this case, the mean luminance of the image is considered to be proportional to T×D×R. Therefore, if the spectral characteristics of the illumination, the transmission characteristics of the divided optical element, the area of the region, and the spectral sensitivity characteristics of the image sensor are known, the arrangement of the divided optical elements can be determined without the mean luminances of the images actually measured.

Furthermore, when the spectral transmittance characteristics of all the divided optical elements have the same profile (the absolute values of the transmittances may differ), it becomes unnecessary to take into consideration the spectral characteristics of the illumination and the spectral sensitivity characteristics of the image sensor. In this case, if the transmission characteristics of the divided optical element and the area of the region are known, the arrangement of the divided optical elements can be determined without the mean luminances of the images actually measured.

In addition, in a case in which the areas of all the regions are equal, if only the transmission characteristics of the divided optical element are known, the arrangement of the divided optical elements can be determined without the mean luminances of the images actually measured.

In addition, although a configuration for obtaining the images $Q_1$ through $Q_6$ corresponding to the respective divided optical elements has been described in the embodiment illustrated in FIG. 1, the embodiment may provide an analyzing apparatus that further includes a processor that obtains an analytical value of an object on the basis of the images $Q_1$ through $Q_6$ of the object. This analyzing apparatus, for example, may further include a memory that stores a relation between the luminance of an image of the object and the analytical value of the object. The processor may refer to the aforementioned relation stored in the memory and obtain an analytical value of the object on the basis of the luminance of the image of the object obtained from the pixels. The analytical value, for example, may be an amount of a component included in the object.

In addition, although the number of pixels included in $N_1$ (i.e., the number of pixels corresponding to a single micro-optical component $M_1$) is equal to the number of regions in the embodiment illustrated in FIG. 3, the number of pixels included in $N_1$ may be greater than the number of regions.

In addition, the center of the transmission wavelength band of the band-pass filter in the present embodiment may lie in a range from 700 nm to 1100 nm inclusive. In a typical image sensor, the sensitivity varies greatly in this wavelength band, and thus the difference among the mean luminances of images corresponding to the respective divided optical elements (i.e., the band-pass filters) tends to increase. Therefore, by applying the arrangement of the divided optical elements described above, a particularly great effect of suppressing an influence of a ghost image and obtaining an accurate analytical value of an object can be achieved.

In addition, the configurations of the imaging apparatus and the analyzing apparatus described in the embodiments above are not limited to the configurations described above, and various modifications can be made.

The imaging apparatus disclosed in the present disclosure can be used effectively as an imaging apparatus in a digital still camera, a video camera, an in-vehicle camera, a security camera, and so on. In addition, the analyzing apparatus of the present disclosure can be applied to a medical, aesthetic, food, or chemical analysis or the like.

What is claimed is:

1. An imaging apparatus, comprising:
    a lens optical system including
        a lens,
        a stop, and
        an optical element including first through nth divided optical elements and having first through nth optical regions, n being an integer equal to or greater than five, the first through nth optical regions being defined in the respective first through nth divided optical elements along a plane perpendicular to an optical axis and positioned to be point-symmetric with respect to the optical axis;
    an image sensor on which light that has passed through the first through nth optical regions is incident, the image sensor including first through nth pixels; and
    a microlens array disposed between the lens optical system and the image sensor, the microlens array guiding the light that has passed through the first through nth optical regions to the first through nth pixels, respectively,
    wherein mean luminances of images obtained from the first through nth pixels when a predetermined object is imaged under a predetermined illumination condition by using the lens optical system, the image sensor, and the microlens array are represented by $s_1, s_2, \ldots,$ and $s_n$, respectively,
    at least three of $s_1, s_2, \ldots,$ and $s_n$ are mutually different values,
    a relation of $s_i \geq s_{i+1}$ is satisfied for any i that satisfies $1 \leq i \leq n-1$, and
    the first optical region and the nth optical region are positioned not to be point-symmetric to each other with respect to the optical axis.

2. The imaging apparatus according to claim 1, wherein at least two of areas of the first through nth optical regions are different from each other.

3. The imaging apparatus according to claim 2, wherein at least two of sensitivities in the first through nth pixels when the light that has passed through the first through nth optical regions are incident on the first through nth pixels are different from each other.

4. The imaging apparatus according to claim 1, wherein the predetermined object is a white reflectance standard.

5. The imaging apparatus according to claim 1, wherein the (n−1)th optical region and the nth optical region are positioned to be point-symmetric to each other with respect to the optical axis.

6. The imaging apparatus according to claim 1, wherein the first optical region and the second optical region are positioned to be point-symmetric to each other with respect to the optical axis.

7. The imaging apparatus according to claim 1, wherein the first optical region and the nth optical region are not adjacent to each other.

8. The imaging apparatus according to claim 1, wherein the predetermined illumination condition is a condition in which light is emitted from a halogen lamp.

9. The imaging apparatus according to claim 1, wherein at least one of the first through nth divided optical elements is a band-pass filter.

10. The imaging apparatus according to claim 9, wherein a center of a transmission wavelength band of the band-pass filter lies in a range from 700 nm to 1100 nm inclusive.

11. The imaging apparatus according to claim 1, wherein at least one of the first through nth divided optical elements is a polarization filter.

12. The imaging apparatus according to claim 1, wherein at least one of the first through nth divided optical elements is a neutral density filter.

13. An analyzing apparatus, comprising:
    an imaging apparatus, including
        a lens optical system including
            a lens,
            a stop, and
            an optical element including first through nth divided optical elements and having first through nth optical regions, n being an integer equal to or greater than five, the first through nth optical regions being defined in the respective first through nth divided optical elements along a plane perpendicular to an optical axis and positioned to be point-symmetric with respect to the optical axis, an image sensor on which light that has passed through the first through nth optical regions is incident, the image sensor including first through nth pixels, and a microlens array disposed between the lens optical system and the image sensor, the microlens array guiding the light that has passed through the first through nth optical regions to the first through nth pixels, respectively, wherein mean luminances of images obtained from the first through nth pixels when a predetermined object is imaged under a predetermined illumination condition by using the lens optical system, the image sensor, and the microlens array are represented by $s_1, s_2, \ldots,$ and $s_n$, at least three of $s_1, s_2, \ldots,$ and $s_n$ are mutually different values, a relation of $s_i \geq s_{i+1}$ is satisfied for any i that satisfies $1 \leq i \leq n-1$, and the first optical region and the nth optical region are positioned not to be point-symmetric to each other with respect to the optical axis; and a processor adapted to obtain an analytical value of the object on the basis of images of the object that are obtained from the first through nth pixels.

14. An imaging apparatus, comprising:

a lens optical system including a lens, a stop, and an optical element including first through nth divided optical elements and having first through nth optical regions, n being an integer equal to or greater than five, the first through nth optical regions being defined in the respective first through nth divided optical elements along a plane perpendicular to an optical axis and positioned to be point-symmetric with respect to the optical axis;

an image sensor on which light that has passed through the first through nth optical regions is incident, the image sensor including first through nth pixels; and a microlens array disposed between the lens optical system and the image sensor, the microlens array guiding the light that has passed through the first through nth optical regions to the first through nth pixels, respectively, wherein areas of the first through nth optical regions are represented by $D_1, D_2, \ldots,$ and $D_n$, respectively, transmittances of the first through nth optical regions under a predetermined illumination condition are represented by $T_1, T_2, \ldots,$ and $T_n$, respectively, sensitivities in the first through nth pixels when the light that has passed through the first through nth optical regions are incident on the first through nth pixels are represented by $R_1, R_2, \ldots,$ and $R_n$, respectively, and $$B_m = D_m \times T_m \times R_m (m=1 \text{ through } n),$$

at least three of $B_1, B_2, \ldots,$ and $B_n$ are mutually different values, a relation of $B_i \geq B_{i+1}$ is satisfied for any i that satisfies $1 \leq i \leq n-1$, and the first optical region and the nth optical region are positioned not to be point-symmetric to each other with respect to the optical axis.

15. The imaging apparatus according to claim 14, wherein at least two of areas of the first through nth optical regions are different from each other.

16. The imaging apparatus according to claim 15, wherein at least two of $R_1, R_2, R_3,$ and $R_4$ are different from each other.

* * * * *